(12) United States Patent
Kiang et al.

(10) Patent No.: US 11,775,874 B2
(45) Date of Patent: Oct. 3, 2023

(54) CONFIGURABLE PREDICTIVE MODELS FOR ACCOUNT SCORING AND SIGNAL SYNCHRONIZATION

(71) Applicant: Oracle International Corporation, Redwood Shores, CA (US)

(72) Inventors: Andrew Kiang, Berkeley, CA (US); Yu-Hui Huang, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 442 days.

(21) Appl. No.: 16/878,568

(22) Filed: May 19, 2020

(65) Prior Publication Data

US 2021/0081706 A1    Mar. 18, 2021

Related U.S. Application Data

(60) Provisional application No. 62/900,575, filed on Sep. 15, 2019.

(51) Int. Cl.
*G06Q 10/00*     (2023.01)
*G06N 20/10*     (2019.01)
(Continued)

(52) U.S. Cl.
CPC ......... *G06N 20/10* (2019.01); *G06F 18/2113* (2023.01); *G06F 18/22* (2023.01);
(Continued)

(58) Field of Classification Search
CPC ..................................................... G06Q 10/00
See application file for complete search history.

(56) References Cited

U.S. PATENT DOCUMENTS

2005/0149507 A1    7/2005  Nye
2008/0312979 A1*  12/2008  Lee .................... G06Q 10/0635
                                                        705/7.39
(Continued)

OTHER PUBLICATIONS

Eranjith, H., Fernando, I. D., Fernando, G., Soysa, W., & Jayasena, V., A visualization and analysis platform for performance tuning, 2016, The Institute of Electrical and Electronics Engineers, Inc. (IEEE) Conference Proceedings (Year: 2016).*

*Primary Examiner* — Matthew L Hamilton
(74) *Attorney, Agent, or Firm* — Invoke

(57) ABSTRACT

Techniques for generating and evaluation predictive models to optimize computing applications are described herein. In some embodiments, a system generates, using a model, a first set of scores for a plurality of accounts, wherein a score in first set of scores for a respective account characterizes a priority of interacting with the respective account relative to other accounts in the plurality of accounts, wherein the model defines a set of criteria for scoring accounts, wherein each criterion in the set of criteria is associated with one or more feature values and a weight. The system may receive user input that modifies the set of criteria. Responsive to the user input the system may update the model and generate, using the updated model, a second set of scores for the plurality of accounts. Actions may be prioritized/executed based at least in part on the account scores.

20 Claims, 17 Drawing Sheets

(51) Int. Cl.
  *G06N 20/00* (2019.01)
  *G06F 18/2113* (2023.01)
  *G06F 18/22* (2023.01)
  *G06F 18/231* (2023.01)

(52) U.S. Cl.
  CPC .......... *G06F 18/231* (2023.01); *G06N 20/00* (2019.01); *G06Q 10/00* (2013.01)

(56) References Cited

U.S. PATENT DOCUMENTS

| | | | |
|---|---|---|---|
| 2011/0023596 A1* | 2/2011 | Fortin | G07D 5/02 |
| | | | 73/163 |
| 2014/0012854 A1 | 1/2014 | Suprasadachandranpilliai | |
| 2014/0122501 A1 | 5/2014 | Shen et al. | |
| 2016/0300141 A1* | 10/2016 | Veeraragavan | H04L 67/535 |
| 2016/0337426 A1 | 11/2016 | Shribman et al. | |
| 2016/0379265 A1* | 12/2016 | Jagota | G06Q 30/0269 |
| | | | 705/14.66 |
| 2017/0249557 A1* | 8/2017 | Tendick | G06Q 30/02 |
| 2019/0108286 A1 | 4/2019 | Pan et al. | |
| 2019/0122770 A1* | 4/2019 | Pengetnze | G16H 50/30 |
| 2021/0256387 A1* | 8/2021 | Chopra | G06V 10/764 |

* cited by examiner

FIG. 4C

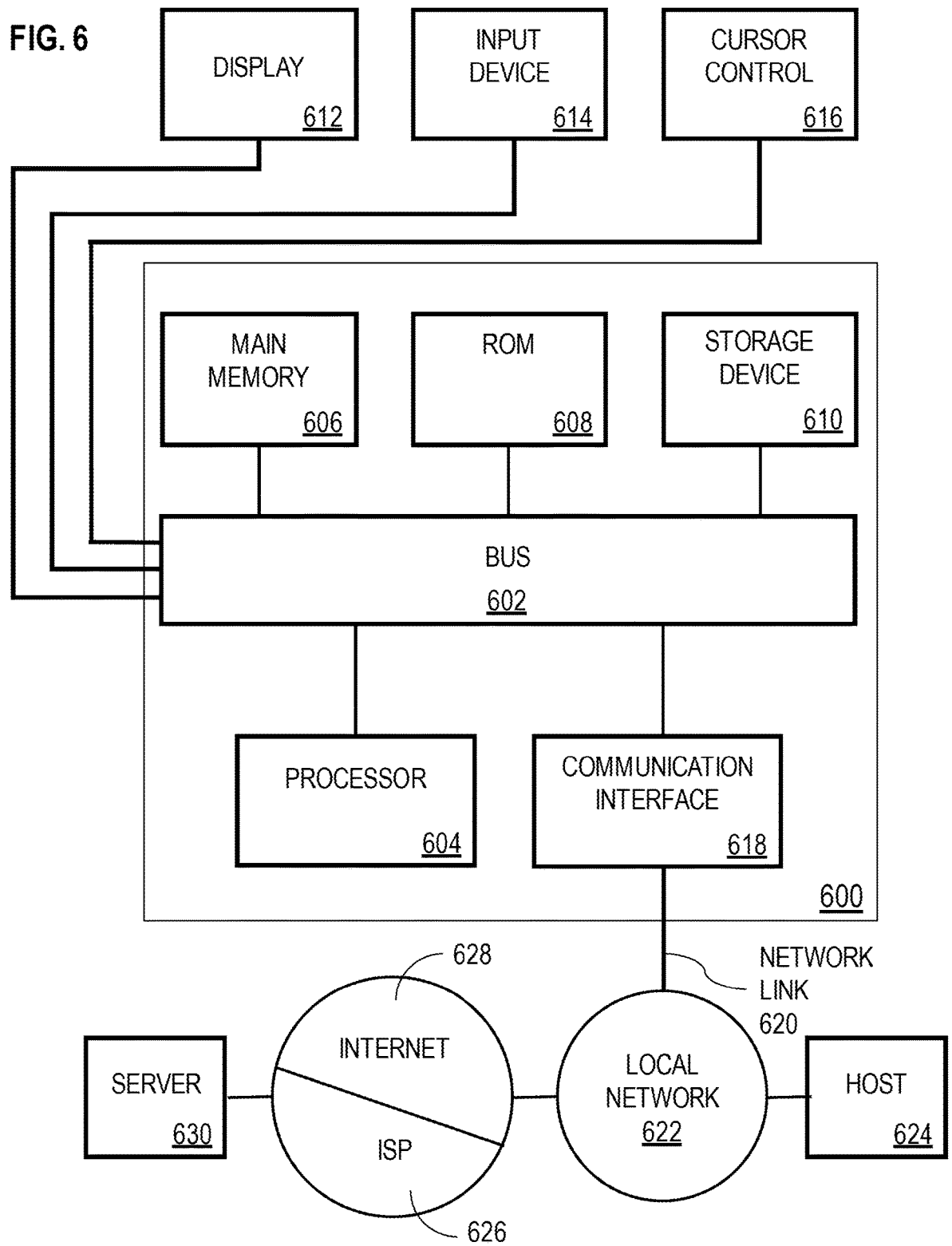

CONFIGURABLE PREDICTIVE MODELS FOR ACCOUNT SCORING AND SIGNAL SYNCHRONIZATION

BENEFIT CLAIM; RELATED APPLICATIONS; INCORPORATION BY REFERENCE

This application claims the benefit of U.S. Provisional Patent Application 62/900,575, filed Sep. 15, 2019, which is hereby incorporated by reference.

This application is related to U.S. Provisional Patent Application 62/900,344, titled "AUTO-LOCATION VERIFICATION"; U.S. application Ser. No. 15/824,833, titled "OPTIMIZATION OF ONLINE ADVERTISING ASSETS"; U.S. application Ser. No. 14/791,105 titled "MANAGING PROGRESSIVE STATISTICAL IDS"; U.S. application Ser. No. 14/831,565, titled "EXTENDING AUDIENCE REACH IN MESSAGING CAMPAIGNS USING PROBABILISTIC ID LINKING"; and U.S. application Ser. No. 16/447,849, titled "AUTOMATED ENHANCEMENT OF OPPORTUNITY INSIGHTS", the entire contents for each of which are incorporated by reference as if set forth in their entirety.

TECHNICAL FIELD

The present disclosure relates to systems and methods for optimizing the effectiveness and efficiency of utilizing computing resources to perform targeted actions.

BACKGROUND

Many software systems are designed to manage actionable opportunities and integrate responsive actions. For example, customer relationship management (CRM) systems may comprise a set of software applications or components for managing opportunities to interact with and provide services to former, current, and future customers. The components may include a listener to identify actionable opportunities for interacting with customers, an analytic component for extracting information about the opportunity, and an interface to facilitate acting upon the opportunities. As another example, a social relationship management (SRM) system may be configured to search for social media content related to a target entity and post automated responses to one or more social media channels. Other enterprise software systems may similarly identify and manage various types of opportunities to perform actions on or using a set of computing resources.

In large systems, the number of opportunities to execute actions may be difficult to process. For example, an SRM system may track hundreds of thousands of opportunities for interactions via social media or other platforms. It is often not an efficient or effective use of computing resources to respond to every opportunity. In some cases, it may not even be feasible to respond to every opportunity due to limited resources. Further, acting on an opportunity may yield little to no benefit or, in a worst-case scenario, may be damaging. Thus, targeting opportunities where the actions are most likely to be successful may help increase system scalability and provide more optimal outcomes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-4E illustrate example interfaces for tuning a model in accordance with some embodiments;

FIG. 6 shows a block diagram that illustrates a computer system in accordance with one or more embodiments.

DETAILED DESCRIPTION

Figure 1:
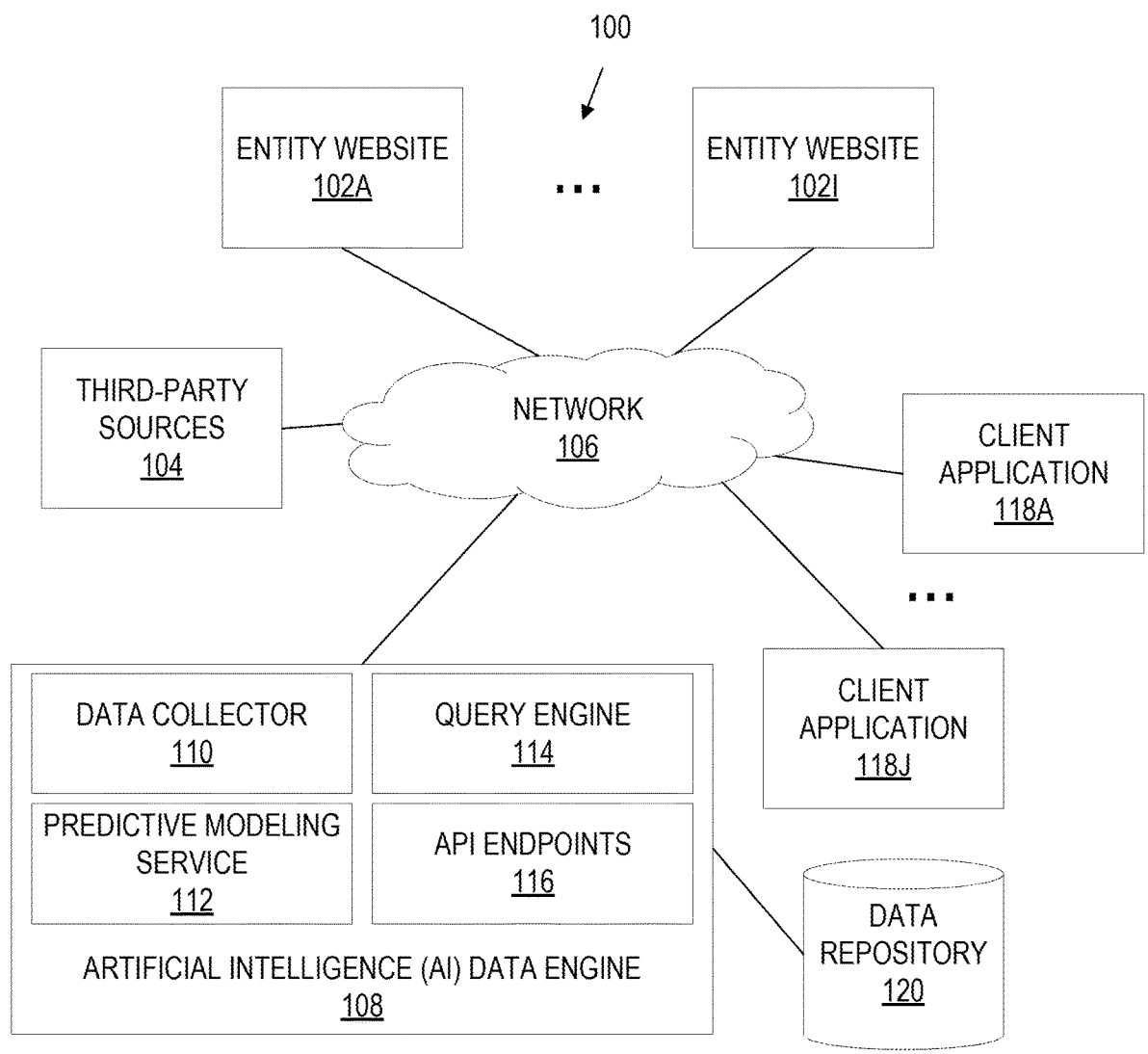
FIG. 1 illustrates a system for enriching opportunity insights based on predictive scoring models for target accounts in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. PREDICTIVE MODELS FOR ACCOUNT SCORING
4. USING PREDICTIVE MODELS FOR ACCOUNT TIERING
5. SYNCHRONIZING SCORES WITH CLIENT APPLICATIONS
6. COMPUTER NETWORKS AND CLOUD NETWORKS
7. HARDWARE OVERVIEW
8. MISCELLANEOUS; EXTENSIONS

1. General Overview

Finding and prioritizing target accounts is beneficial for a variety of enterprise software applications, including, without limitation, customer relationship management, social media relationship management, campaign management, field event planning, and supply chain management systems. Effective prioritization of target accounts allows for more efficient use of system resources by directing actions that have the highest likelihood of success. Ineffective prioritization may not only waste system resources, but lead to negative interactions, loss of revenue, and other significant consequences.

Techniques described herein facilitate prioritization of target accounts and associated actions/opportunities through a predictive account scoring model. Account scores may represent a prediction of the likelihood that actions targeted to the account will be successful. The account scores may be consumed by one or more client applications to enrich data, guide workflows, recommend actions, and/or trigger other automated actions.

Predictive machine-learning models often operate as black boxes with limited explanation as to how the model ultimately arrived at a prediction. The techniques described herein provide for a predictive model that is transparent and may be highly configurable by end users. In some embodiments, the predictive model may produce a scoring summary for each target account that breaks down the account score into a set of component parts with corresponding explanations on how each part contributed to the final account score. For example, the scoring summary may identify the weights given to a set of features, also referred to herein as criteria. A user may tune the predictive model by editing the component parts, such as adding/removing features and/or adjusting feature weightings.

Additionally or alternatively, a machine-learning engine may recommend and/or automatically assign features and weights for the component parts. For example, the machine learning engine may receive a set of labels for a given action from an enterprise system, such as a CRM or campaign management system. The labels may indicate a set of target accounts for which an action was successful. The machine learning engine may train one or more models to learn patterns in the features sets that lead to successful or unsuccessful results. These values may be recommended or automatically set in the predictive model. The model may be tuned as additional examples are provided to increase the prediction accuracy.

One or more embodiments described in this Specification and/or recited in the claims may not be included in this General Overview section.

2. Architectural Overview

FIG. 1 illustrates system 100 for enriching opportunity insights based on predictive scoring models for target accounts in accordance with some embodiments. In some embodiments, system 100 may include more or fewer components than the components illustrated in FIG. 1. The components illustrated in FIG. 1 may be implemented in software and/or hardware. Each component may be distributed over multiple applications and/or machines. Multiple components may be combined into one application and/or machine. Operations described with respect to one component may instead be performed by another component.

Referring to FIG. 1, system 100 includes entity websites 102a-i, third party source 104, artificial intelligence (AI) data engine 108, and client applications 118a-j, which are communicatively coupled via network 106. Network 106 represents one or more data communication networks, such as the Internet. The different subsystems within system 100 may communicate over network 106 using one or more communication protocols, such as protocols belonging to the Internet Protocol (IP) suite.

In some embodiments (AI) data engine 108 is configured to automatically extract and manage entity-level data and signals. AI data engine 108 may use natural-language processing, machine learning, and/or other techniques to extract entity data and verify that the data is accurate. The data may be consumed by client applications 118a-j for various application-specific functions.

In some embodiments, AI data engine 108 includes data collector 110, predictive modeling service 112, query engine 114, and application programming interface (API) endpoints 116. Data collector 110 may be automatically collect entity information from trusted sources. In some embodiments, data collector 110 is configured to scrape data from entity websites 102. For example, data collector 110 may extract location information, information about job openings, and/or any other data about an entity. To scrape the information, data collector 110 may fetch webpages from entity websites 102A-i via network 106 using the Hypertext Transfer Protocol (HTTP) and/or other communication protocols of the IP suite.

Additionally or alternatively, data collector 110 may receive entity data from other sources, such as third-party sources 104 and/or client applications 118a-j. Third-party sources 104 may provide access to information that may or may not also be on entity websites 102a-i. Third-party sources 104 may be restricted to sources that are trusted to provide accurate information. Third-party sources 104 may include, but are not limited to, government servers (e.g., the Security and Exchange Commission's (SEC's) Electronic Data Gathering, Analysis, and Retrieval system), third-party business intelligence (BI) systems, and news websites. One or more of third-party sources 104 may be paid subscriptions services. Data collector 110 may access subscription services through using authentication protocols, such as OAuth, which may provide data collector 110 with secure delegated access to server resources available through the subscription service.

Predictive modeling service 112 is configured to build and evaluate predictive models for prioritizing actions on target accounts. In some embodiments, predictive models receive a set of account information as input and outputs a set of scores for the input account(s). The scores for a given account may represent a prediction or likelihood that actions directed to the target account by client applications 118a-j will be successful. A target account in this context may correspond to any entity, including, but not limited to, a company, an educational institution, or some other organization. Techniques for generating and using predictive models are described further below.

Query engine 114 processes inbound requests from client applications 118a-j. In some embodiments, client applications 118a-j may submit a "match entity" query that seeks current, accurate information on entities that match specified criteria. For example, a query may request all companies within threshold distance of a given location that have an account score greater than a threshold. As another example, a "find similar entity" query may search for entities that are similar to a provided entity. The similarity measure may factor in the generated account score and/or other entity features.

API endpoints 116 provide communication channels through which client applications 118a-j may invoke functions of AI data engine 108. For example, client applications 118a-j may submit HTTP requests that invoke the "match entity", "find similar entity", and/or other functions to enrich data. As another example, client applications 118a-j may query entities that have a relevancy score to a particular application-specific function, where the relevancy score may be based in part on the primary location of the quantity.

In some embodiments, the endpoints are Representational State Transfer (REST) based endpoints that allow for stateless operations between client applications 118a-j and AI data engine 108. For instance, an API endpoint may be associated with a uniform resource identifier (URI) for submitting requests. Client applications 118a-j may submit HTTP requests to the corresponding URIs to invoke functions that are exposed by AI data engine 108.

Data repository 120 may store and provide access to data for AI data engine 108. In some embodiments, data repository 120 stores entity profiles for entities that are subject to targeted actions by client applications 118*a-j*. Data repository 120 may be any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as AI engine 108. In other embodiments, data repository 120 may be implemented or executed on a computing system separate from AI engine 108. Data repository 120 may be communicatively coupled to AI data engine 108 via a direct connection or via network 106.

Client applications 118*a-j* may be any applications that may benefit from invoking functions and consuming data provided by AI data engine 108. In some embodiments, client applications 118*a-j* include one or more CRM systems. A CRM system may synchronize database records with the entity profiles stored in data repository 120 to help ensure that the application is operating on accurate, up-to-date intelligence about an entity. For example, accurate location information may help ensure that opportunities that are most likely to be successful are taken and routed to the appropriate CRM users (e.g., representatives that are geographically located in and/or assigned to the same location). An example CRM system is further described in U.S. application Ser. No. 16/447,849, titled "AUTOMATED ENHANCEMENT OF OPPORTUNITY INSIGHTS", which was previously incorporated by reference.

Additionally or alternatively, client applications 118*a-j* may include other types of applications. For example, a social media relationship management system (SRM) may select a post that is directed to or includes content about a target entity that is most likely to result in a positive sentiment. As another example, a campaign management system may coordinate online campaigns whereby promotional messages are sent to target entities that are most likely to respond. In yet another example, a bid management application may automatically screen/filter bids that originate from entities matching a certain profile.

In some embodiments, client applications 118*a-j* include frontend interfaces for interacting with end users. A frontend interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In some embodiments, different components of an interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the interface may be specified in one or more other languages, such as Java, C, or C++.

In some embodiments, AI data engine 108 represents a cloud service, with client applications 118*a-j* corresponding to different tenants that share access to resources exposed by the cloud service, such as the entity profiles. Different tenants may be independent from each other. For example, client applications 118*a-j* may be associated with accounts registered to different corporations, organizations, and/or other entities. Client applications 118*a-j* may access AI data engine 108 using different authentication credentials. Further, AI data engine 108 may maintain the anonymity the tenants such that the tenants are prevented from accessing any information that reveals the identify of another tenant. For instances, AI data engine 108 may prevent a tenant from viewing information about the names of the other organization accessing the data and the hostnames and IP addresses of resources belonging to other tenants that are accessing the API endpoints 116.

In some embodiments, the components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks and microservices are described below in Section 6, titled "Computer Networks and Cloud Networks", and Section 7, titled "Microservice Applications", respectively.

3. Predictive Models for Account Scoring

Account scoring may be used to prioritize actions among a set of target entities to optimize resource utilization and action outcomes. The predictive account scoring model may be transparent and configurable to bolster confidence that the model output is aligned with and prioritizing accounts in an optimal manner.

In some embodiments, the model allows a user to select and weight different criteria. A criterion in this context may be defined as a set of one or more feature values. A feature value may be a value of any entity attribute. Feature values may be scraped or otherwise collected by data collector 110 from entity websites 102*a-i*, third-party sources 104, client applications 118*a-j*, manual curation, and/or any other source. Example features may include, but are not limited to:

an entity's location (e.g., the company headquarters and/or satellite offices);
technographic information (e.g., what technology the entity is using and/or interested in);
sector information (e.g., what industry/sub-industries the entity is practicing in);
conference attendance records (e.g., what technology conferences did a company representative attend);
funding information (e.g., what venture capital firms are backing company and how much money has been raised);
award information (e.g., what honors/recognition has company recently received);
growth signals (e.g., new office openings, key executive hires, new product launches, new patents).

In some embodiments, each model scoring criterion is associated with a weight. For example, a criterion may be defined as follows "Headquarters Location: San Jose (100 points)". During scoring, each account with a headquarters in San Jose has 100 points added to the overall account score. The point value may be adjusted up to give the criterion more weight or down to reduce the weight relative to other criteria.

As previously mentioned, a criterion may also be defined as a function of combinations of feature values. For example, a criterion may be defined as follows "Technographic: Salesforce AND Eloqua (50 points)". During scoring, each account that uses the CRM platform Salesforce and the marketing platform Eloqua has 50 points added to the account score.

In some embodiments, a model scoring criterion may be associated with a negative weight. For example, the model may learn that campaign actions directed at companies with a headcount less than a threshold are less likely to have positive outcomes. The model may define a criterion as follows: "Headcount<50 (−25 points)". During scoring, each account with an associated headcount of less than fifty has 25 points deducted from the account score.

Figure 2:
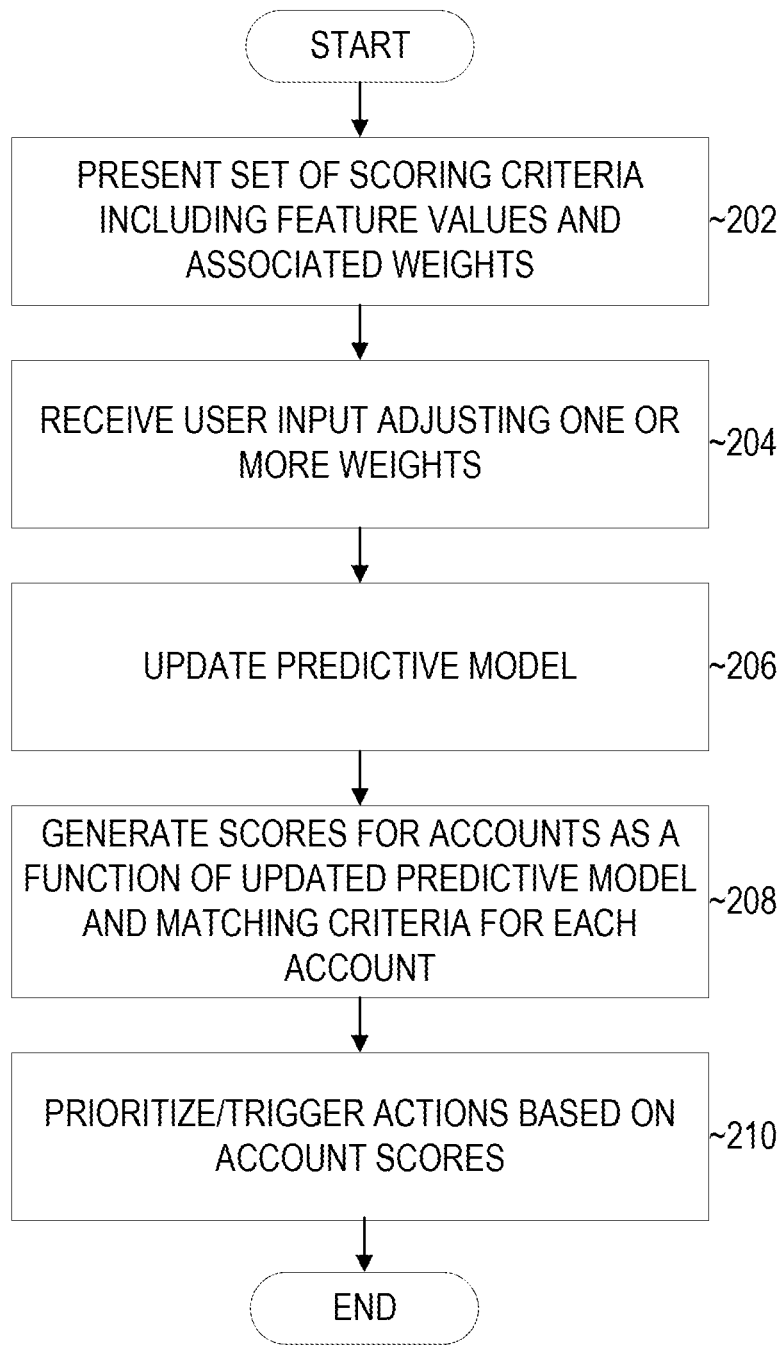
FIG. 2 illustrates an example set of operations for configuring and using a predictive model to provide actionable insights in accordance with some embodiments.

FIG. 2 illustrates an example set of operations for configuring and using a predictive model to provide actionable insights in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

The process includes presenting a set of scoring criteria including the feature values and associated weights (operation 202). In some embodiments, the model may initially use a set of default weights. The weights may be determined through machine learning, statistical analysis, and/or manual curation, depending on the particular implementation.

The process includes receiving user input adjusting the one or more weights (operation 204). During this operation, the user may increase or decrease, via a user interface, weights to individual features or feature combinations that were previously assigned. In some cases, the user may override a value that was automatically assigned, such as a default value or a one that was assigned by a machine-learning engine.

Responsive to the user input, the process updates the predictive model for scoring accounts (operation 206). In some embodiments, the process only updates the one or more weights adjusted by the user. In other embodiments, the adjustment of the one or more weights may be fed as feedback to the predictive model. For example, with neural networks, gradient descent may be used to determine an initial set of weights that yield the lowest prediction error as determined by an error function. The user may then adjust one or more of the weights. In response, the neural network model may be updated by again performing gradient descent but keeping the weights input by the user fixed. The result may be a new set of weights for other features not adjusted by the user that yield the lowest prediction error given the set of weights input by the user. Other machine learning models may similarly adjust weights for the other features to minimize error given the user-specified weights. For example, a probabilistic support vector machine (SVM) may recompute the boundaries of a hyperplane to minimize a loss function, where the feature weights are determined by the boundaries. Thus, a user-specified update of one weight may serve as a feedback loop that causes other weights to be automatically adjusted.

The process further generates scores for a set of accounts as a function of the updated predictive model and matching criteria for each account (operation 208). The total score for an account may be obtained by summing or otherwise aggregating the weight for each criterion that matches feature values extracted for an account.

The process further includes prioritizing and/or triggering actions based, at least in part, on the account score (operation 210). In some embodiments, AI data engine 108 provides the scores and/or account tiers (described further below) to client applications 118*a-j*. A client application may use the scores to prioritize opportunities in a pipeline. For example, the client application may recommend directing a marketing campaign to accounts that are scored the highest or fall within a particular tier. As another example, the client application may recommend against or automatically prevent actions from being taken with respect to accounts with scores below a threshold.

In some embodiments, clients of AI data engine 108 are able to access templates and GUIs to configure model parameters. FIGS. 3A-3F are a set of screenshots illustrating example interfaces for configuring criteria and associated weights of a predictive model for scoring target accounts in accordance with some embodiments.

Figure 3A:
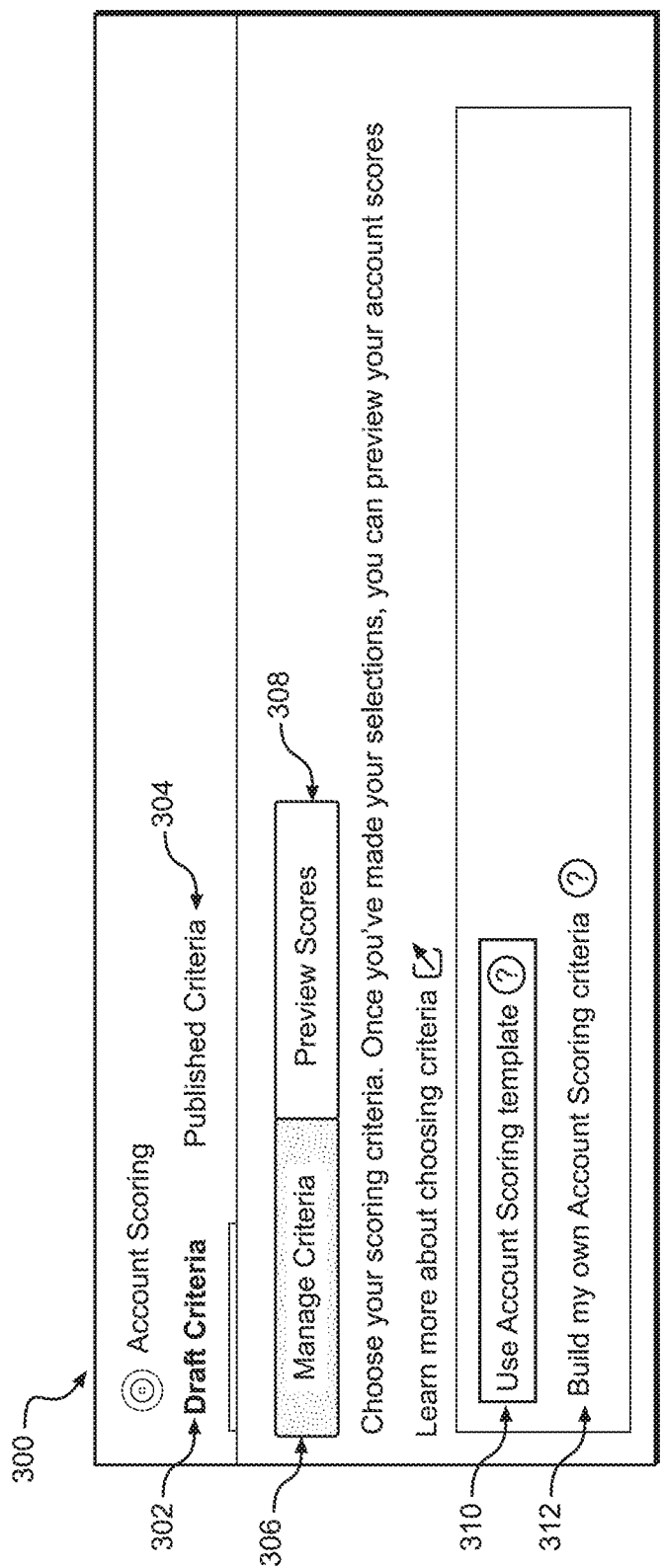
FIGS. 3A-3F illustrate example interfaces for configuring criteria and associated weights of a predictive model for scoring target accounts in accordance with some embodiments.

Referring to FIG. 3A, user interface 300 presents interface objects through which a user may manage model criteria. 'Draft Criteria' tab 302, when selected, allows a user to add, delete, and add input criteria to a predictive model. 'Published Criteria' tab 304 allows a user to view criteria and/or other model parameters that are currently being used in a deployed model. Model parameters in a draft state may be restricted from being synchronized to consuming client applications. Access to draft criteria may further be restricted to one or more users, which may be tenants of a cloud service that provides the model. Publishing the criteria updates the model and scores as previously described. The published model parameters may be synchronized to the client applications, which may trigger one or more application-specific functions based on the model output. Synchronizing model output is discussed further below in Section 5, titled "Synchronizing Scores with Client Applications".

When 'Draft Criteria' tab 302 is selected, the user may select 'Manage Criteria' tab 306 or 'Preview Scores' tab 308. In the 'Manage Criteria' interface, the user may select link 310 to use an account scoring template or link 312 to build custom account scoring criteria. The 'Preview Scores' tab 308 allows the user to preview the update model output using the draft criteria before the draft parameters are published for synchronization with client applications.

Figure 3B:
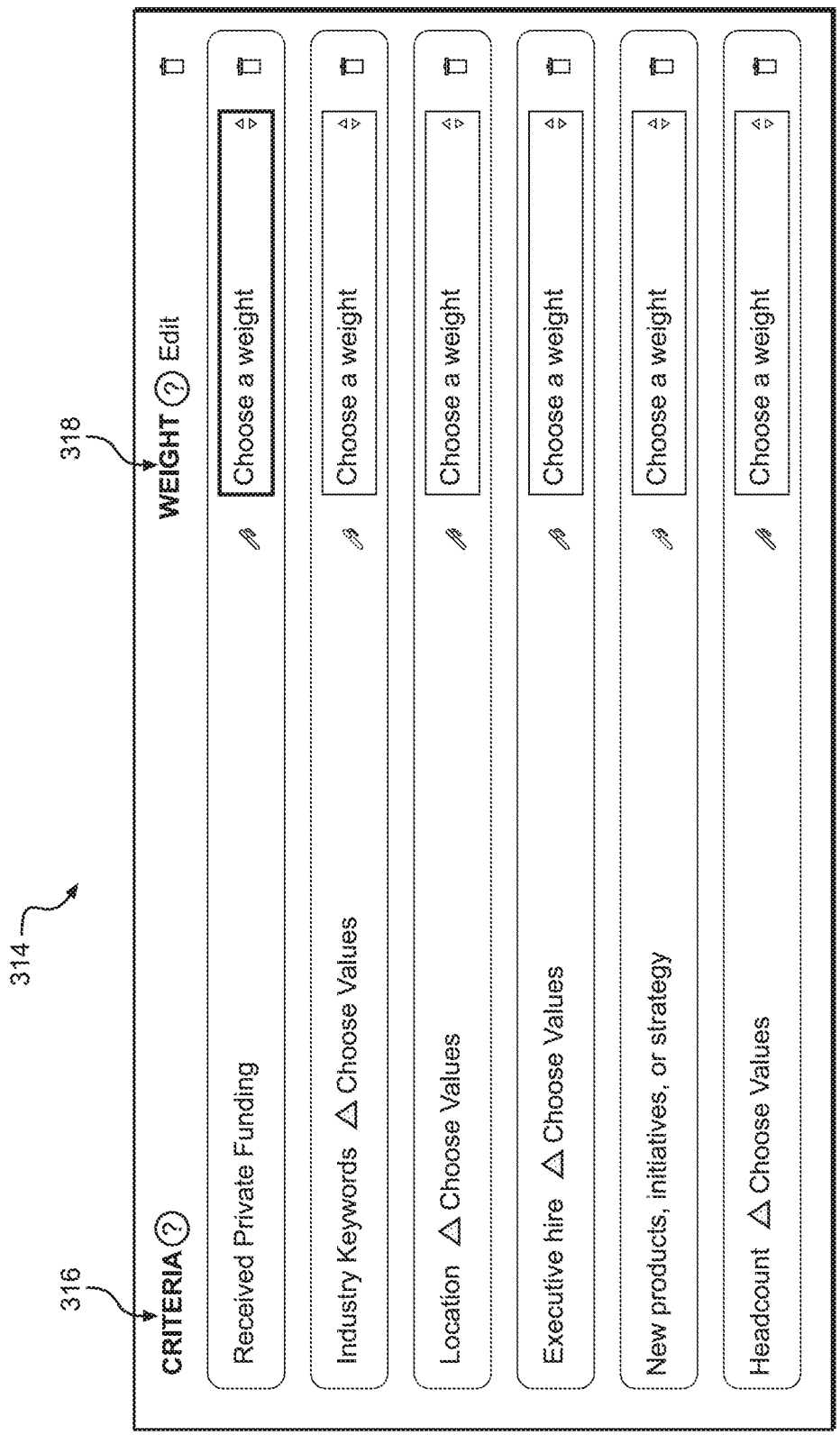

Referring to FIG. 3B, interface 314 presents a template comprising a pre-populated list of criteria. The template may be presented responsive to a user selecting link 310. The template includes criteria 316 and weights 318. A user may adjust the weights and feature values in the template to customize the template. For example, the user may select "Choose values" next to the "Location" criterion. The user may then input a country (e.g., United States) or, for a more localized approach, a zip code. Other location values may also be specified (e.g., state, province, city, etc.) In some embodiments, the template may include common criteria, filters, and/or weights used by other tenants. For example, the service may identify tenants with similar attributes to the current tenant and populate interface 314 with criteria that recur more than a threshold number of times among the identified tenants. Templates allow users to quickly build criteria for account scoring to provide actionable insights.

Figure 3C:
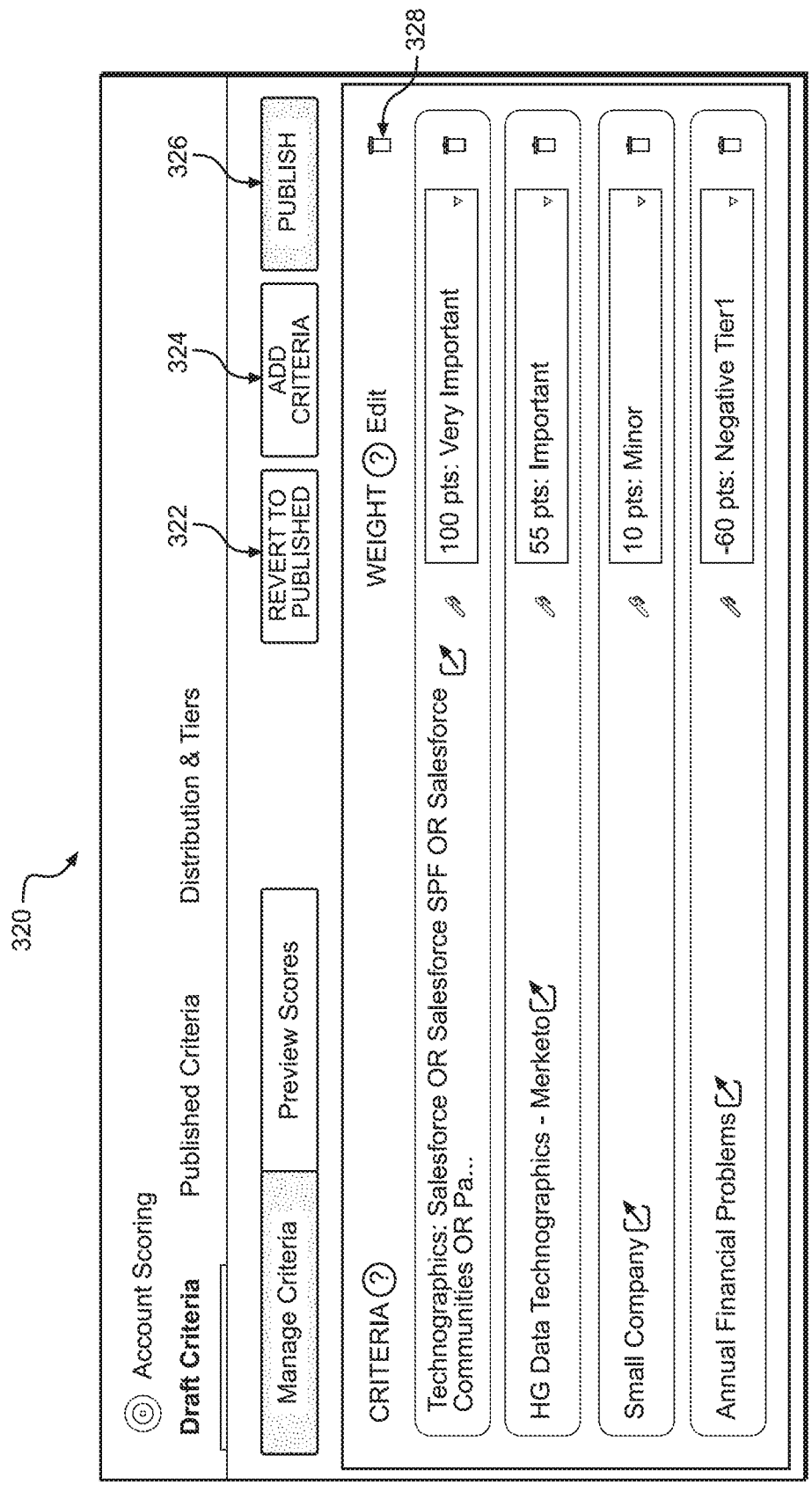

Referring to FIG. 3C, interface 320 presents a set of interface objects for viewing and editing draft model criteria and associated weights. In the example depicted, the first Technographic criterion is assigned a weight of 100 points. This score is shown to be very important as it is high relative to other criteria in the model. The HG Data Technographics criterion looks for accounts that use Marketo and is assigned a weight of 55 points, which is shown to be important relative to the other criteria. The next criterion gives 10 points for small companies which is a minor criterion, and the final criterion deducts 60 points if annual financial problems are detected. The exact point values are arbitrary and may vary from implementation to implementation. A user may select 'Revert to Published' interface object 322 to discard the current draft model criteria and go back to the currently published criteria. The user may select 'Add Criteria' interface object 324 to add one or more additional model criteria and the trash icon 328 to delete one or more criteria. The trash icon next to each individual criterion may also be selected to delete the corresponding criterion. 'Publish' interface object 326 may be selected to publish the draft criteria that are currently being viewed through interface 320.

As previously mentioned, the model criteria and weights that are initially presented may be default values. In some embodiments, a default weight is determined based on a statistical analysis of the feature across the universe of entities known by AI data engine 108. For example, the weight may be assigned as a function of the standard deviation of that value across the universe of entities.

In other embodiments, default weights are assigned by a machine learning model. A machine learning engine may receive a set of labelled training data from one or more client applications. A data point in the training data may identify an action that was taken, an entity that was the target of the action, and an outcome indicating whether the action was successful or not. The machine learning engine may then perform a classification and regression analysis to identify which criteria are predictors of the outcome and determine weights for the predictive criteria. In some embodiments, the machine learning engine trains a plurality of candidate models having different weights and/or features and selects the candidate model parameters that yield the lowest estimation error. Example machine learning models may include, but are not limited to, artificial neural networks, probabilistic SVMs, and random forest models.

Figure 3D:
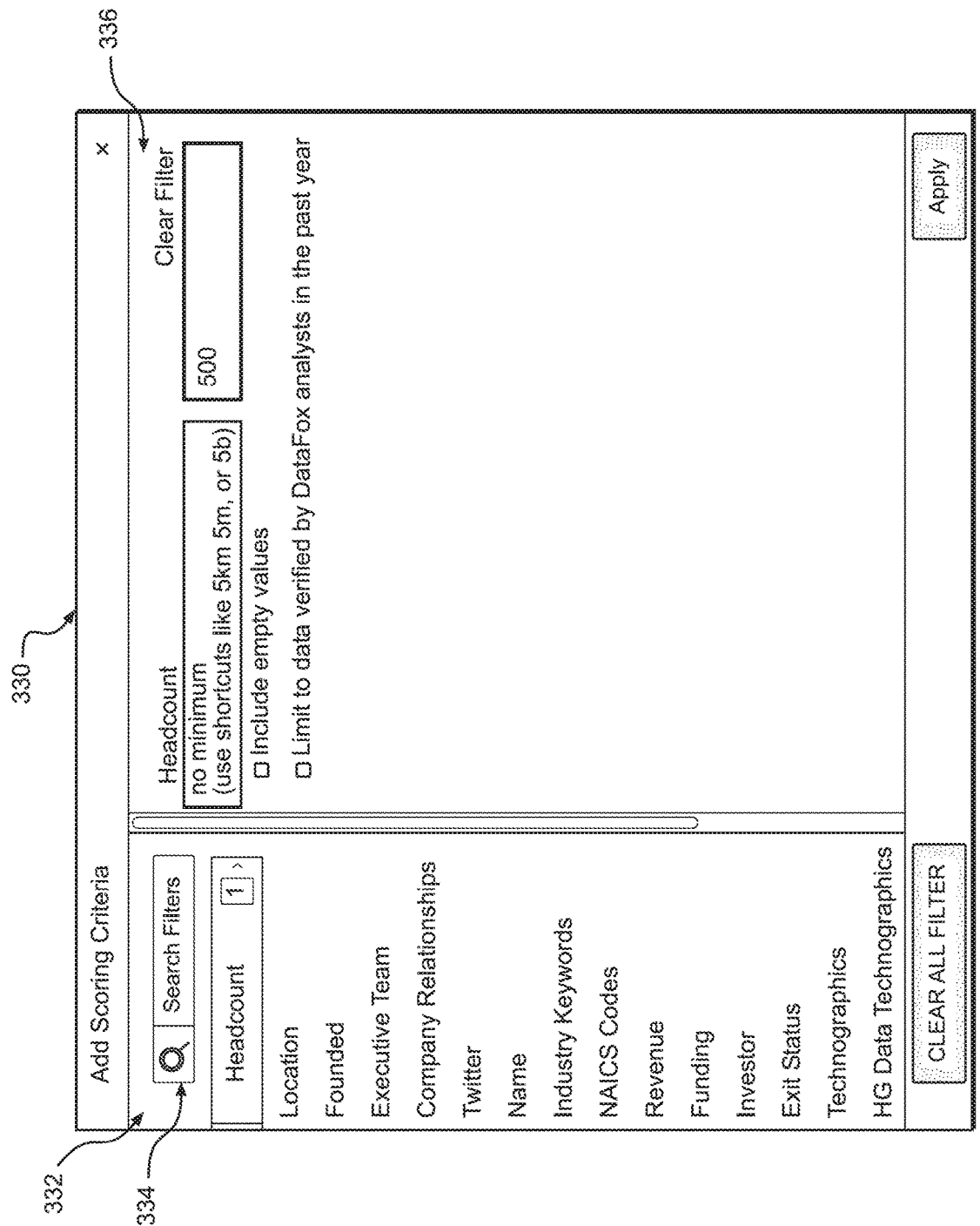

If a user believes the model parameters are no longer aligning with a desired objective, the user may adjust the weights at any time. Referring to FIG. 3D, interface 330 provides a set of interface objects for adding scoring criteria. In the interface, the user may select from a variety of entity attributes from object pane 332 in the left-hand column. Object pane 332 further allows users to search and filter available criteria from search box 334. In the example shown, the user has selected headcount from object pane 332. Object pane 336 allows the user to input any integer value as a filter for scoring an account. The user may use shorthand notation, such as 5 k for 5,000 or 5 m for 5,000,000 as a shortcut to facilitate data entry. Object pane 336 further allows matches to be limited to data verified by AI data engine 108. Thus, the quality and/or level of trust in data may be factored into the model.

Figure 3E:
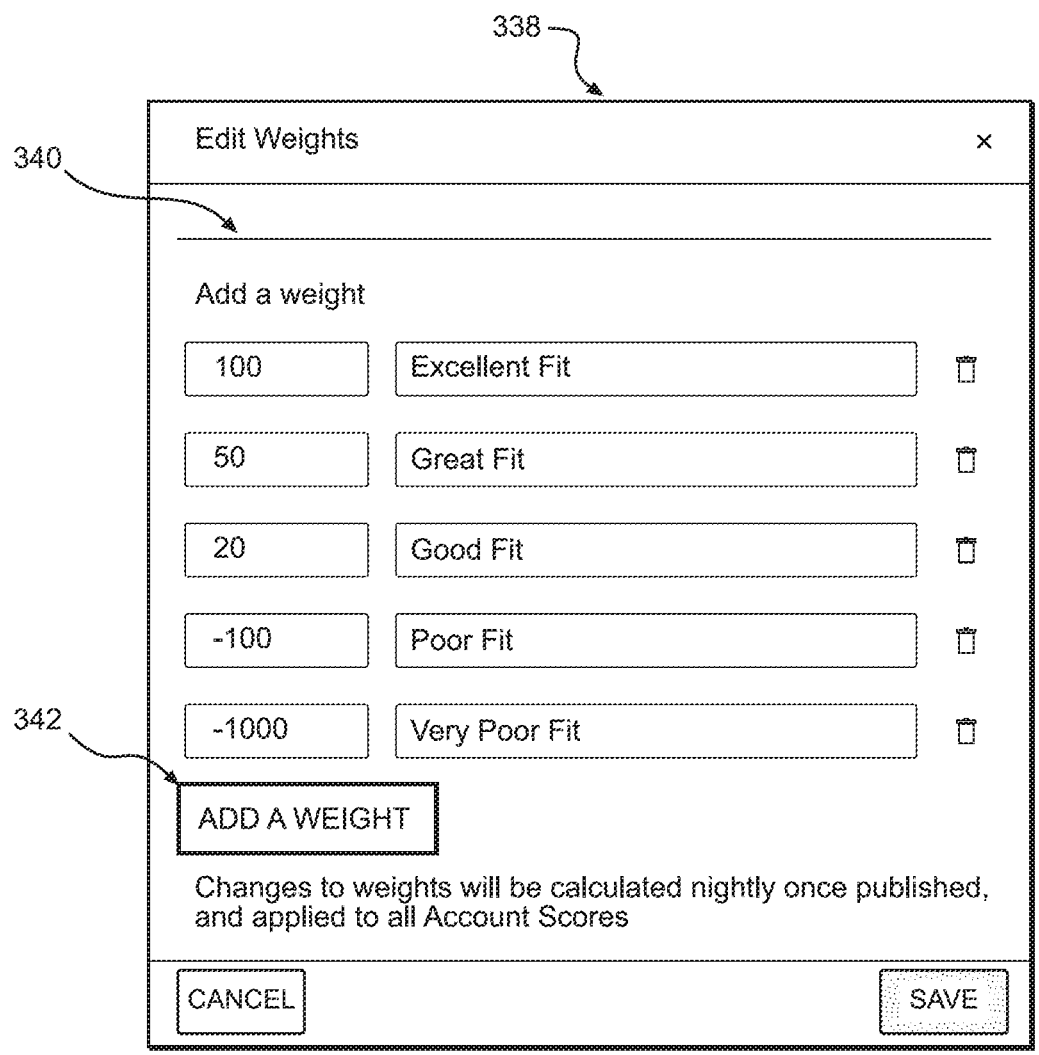

Referring to FIG. 3E, interface 338 provides a set of interface objects for editing weights. A set of default weights and their corresponding meaning is presented in display area 340. In the current example, a weight of 100 is an excellent fit, a weight of 50 is a great fit, a weight of 20 is a good fit, a weight of −100 is a poor fit and a weight of −1000 is a very poor fit. The user may also build out weight tiers by selecting "Add a weight" interface object 342. Each weight tier may be assigned a corresponding label to facilitate understanding of the model output.

Figure 3F:
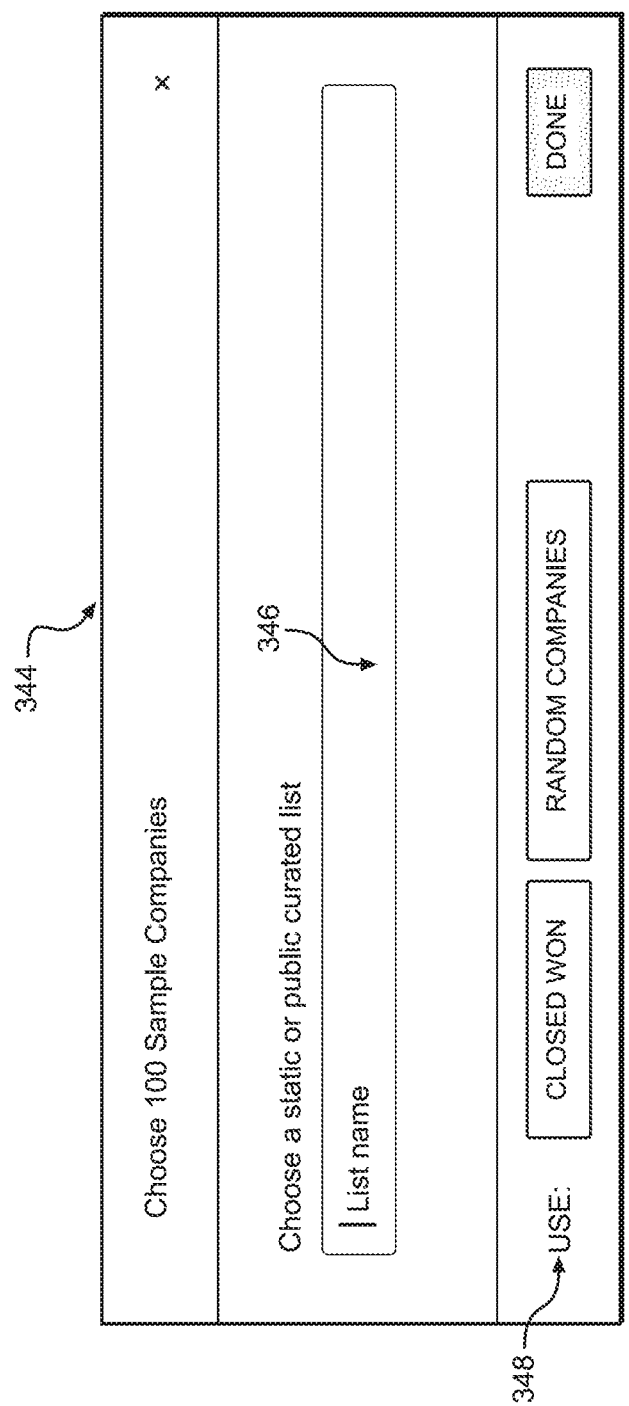

Once defined, the model parameters may be previewed or published. The preview feature allows a user to analyze the model on a set of sample data to make sure the correct accounts are receiving higher scores. Referring to FIG. 3F, interface 344 provides interface objects for configuring parameters to preview the model output. Search box 346 allows the user to search for and select one or more lists of companies, where each list represents a sample group and is associated with a corresponding name. In the present example, the user has selected a Closed Won opportunities from a CRM system and a random group of companies from the database, as reflected in display area 348. After selecting preview, the user may be presented with a distribution graph with general guidelines to read the chart and individual company matrix.

Previewing the output may help a user tune the model. For example, user may tune the model parameters until the target companies in the sample set align with the user's objectives. FIGS. 4A-4F are a set of screenshots illustrating example interfaces for tuning a model in accordance with some embodiments.

Figure 4A:
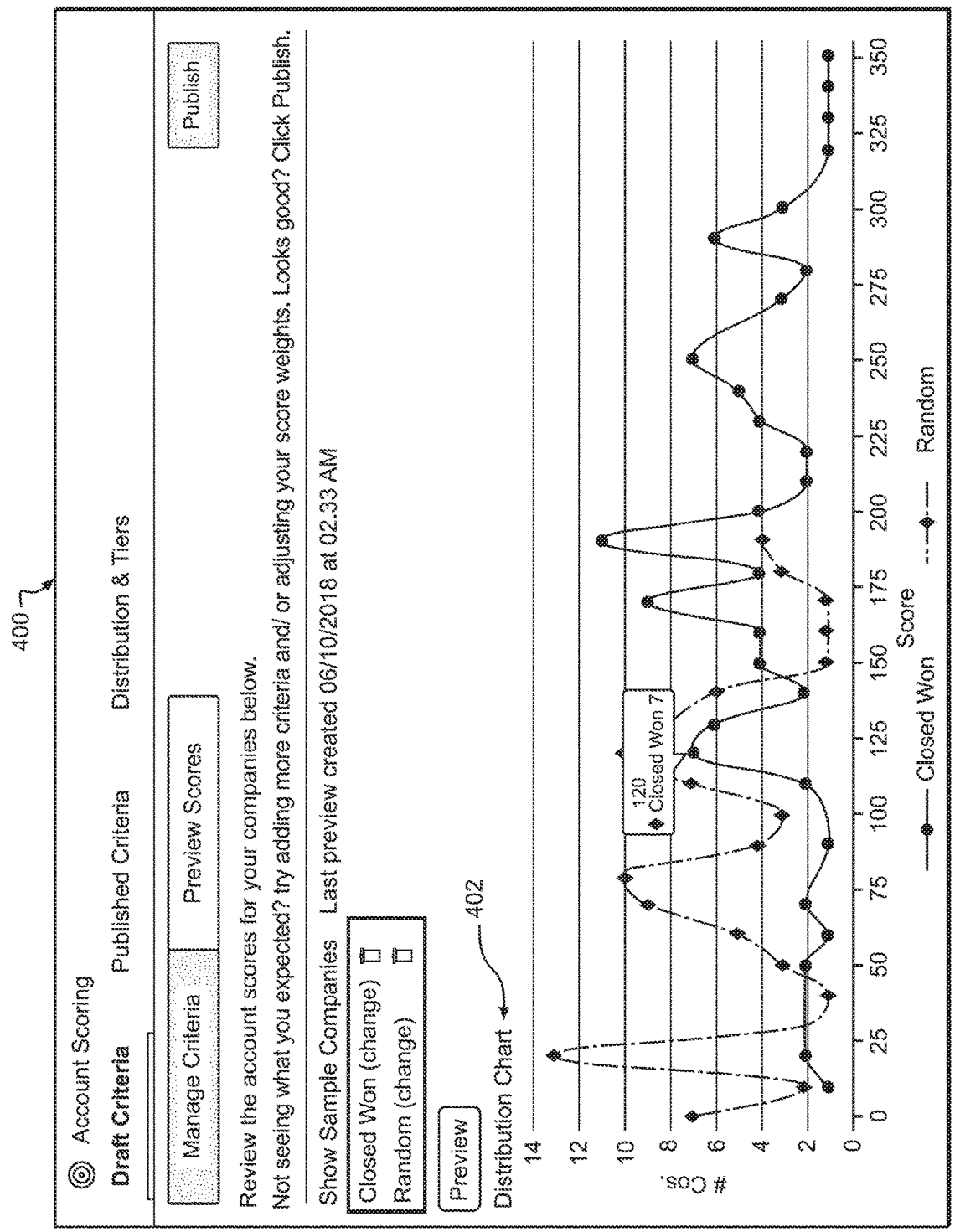

Referring to FIG. 4A, interface 400 includes example distribution chart 402 for previewing account scores. The Y-axis in this example represents the number of entities, while the X-axis represents the account score. Closed won opportunities may track accounts for which a successful outcome of a targeted action was achieved. The model may be tuned with the goal of shifting these data points to the right of the X-axis scoring higher and the random group having various peaks. The random group may be provided for a baseline check. If these are also shifted to the right of the X-axis, then it may indicate that the model is poorly tuned.

Figure 4B:
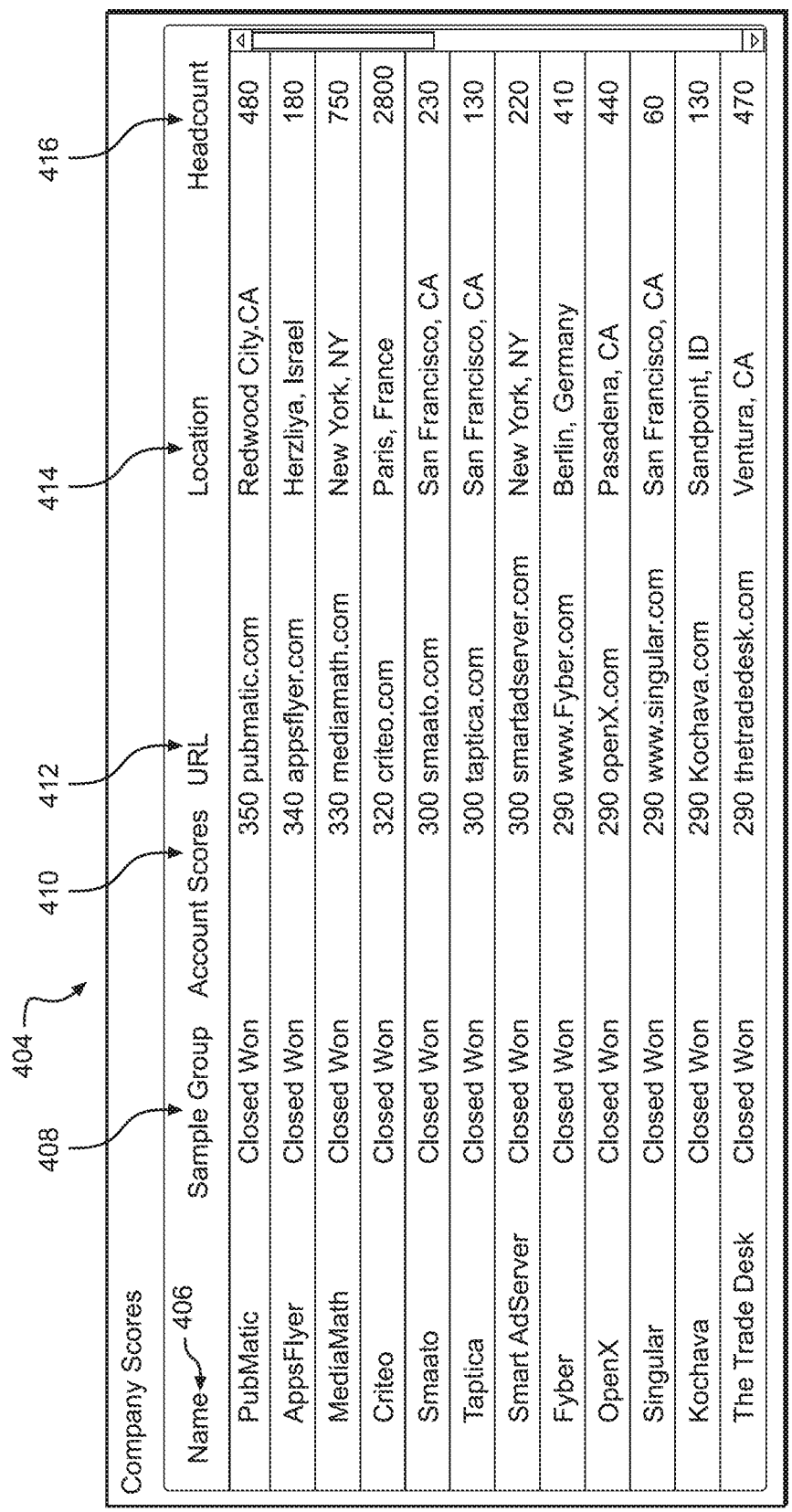

Referring to FIG. 4B, interface 404 depicts a list of how individual accounts are scored. The list includes a set of records, with each record corresponding to a different account. In the example list presented by interface 404, a set of attribute values are displayed including name 406, sample group 408, account score 410, URL 412, location 414, and headcount 416. The attributes that are presented may vary depending on the particular implementation. The list may be compared to lists scored using different criteria to determine how individual accounts are impacted by criteria adjustments.

Figure 4C:
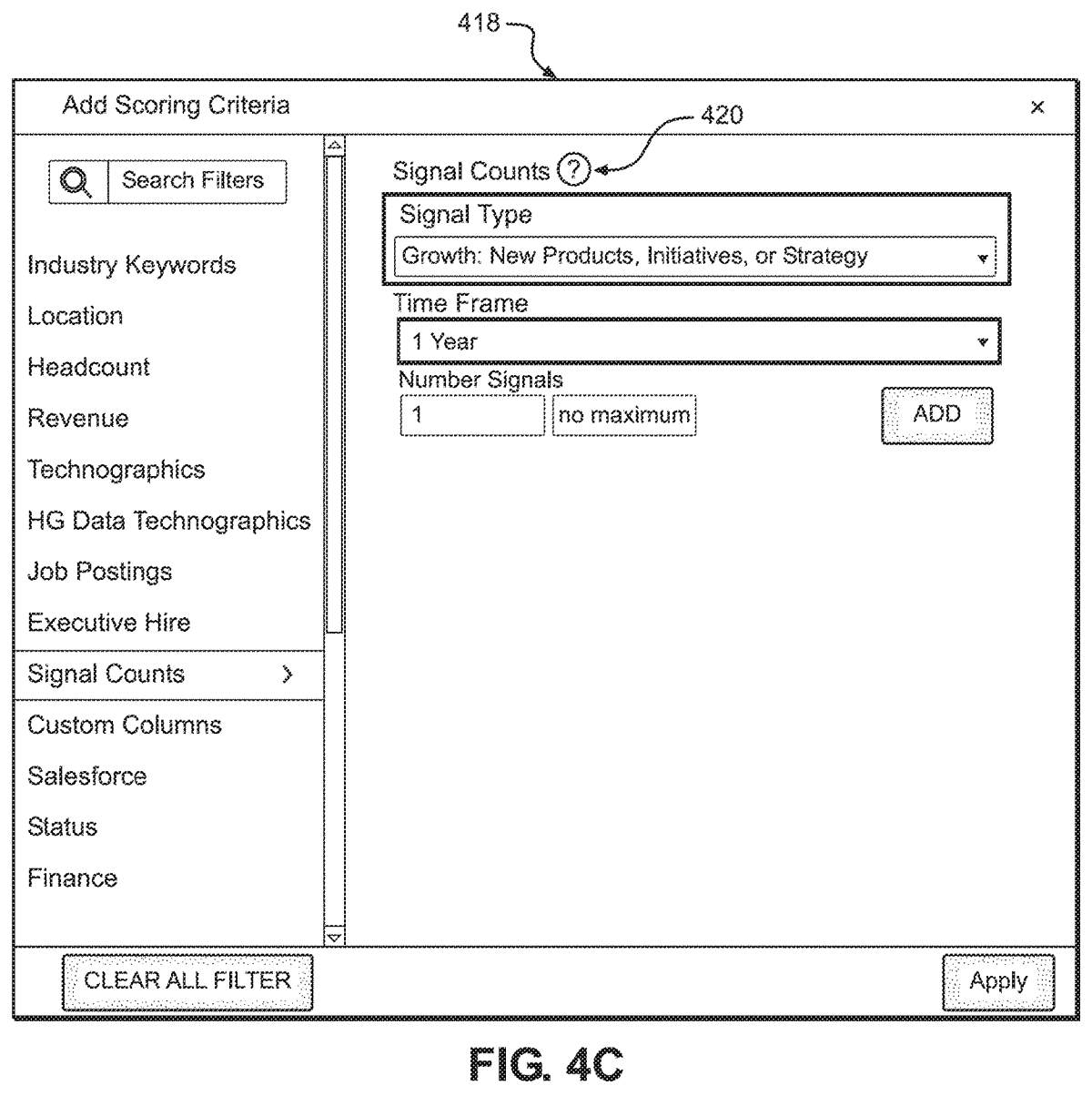

To tune a model, a user or automated process may begin iterating through weights until the distribution graph approximates the ideal entity profile. Referring to FIG. 4C, interface 418 provides a set of interface objects to adjust model criteria. Object pane 420 provides parameters for a criterion that monitors for new signals. Here, a criterion is added to look for new products in the past year. The user may adjust the signal type and timeframe for monitoring for the signal. The number of signals may also be configured between a minimum and maximum. Signals that match the filters for the criterion contribute to the overall score of an account.

Figure 4D:
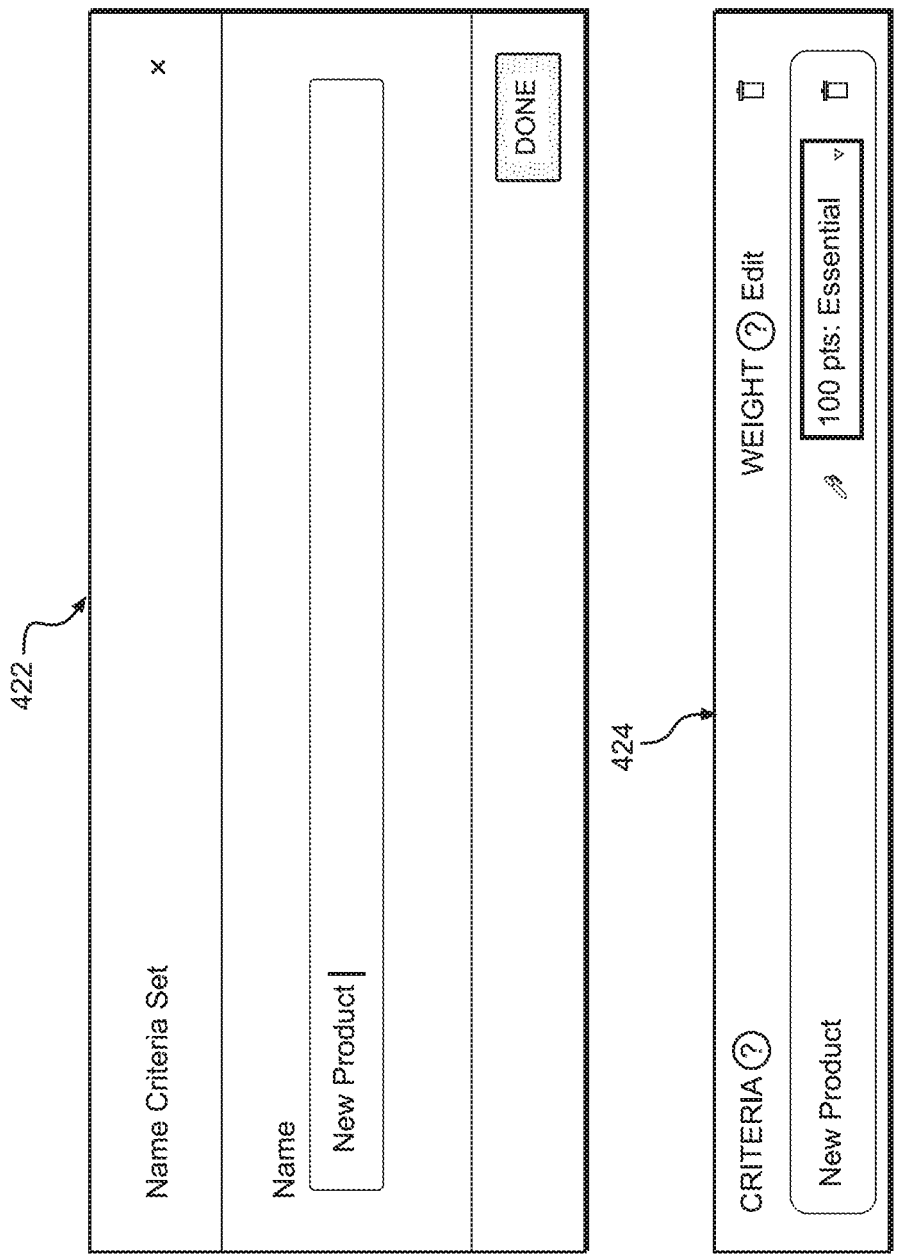

Referring to FIG. 4D, interface 422 includes an interface object for adding a new name for a criteria set. Interface 424 allows the user to adjust the weight for the newly added criteria set. In the present example, the name "New Product" is added to the criteria list with a weight of 100 points. The naming interface may further include an interface object that accepts input from a user to include tips/advice for a feature that may be helpful for representatives. For instance, a user may make a note "Do not discuss new product with entity" if found to be unhelpful or other advice to help representatives interacting with a given account.

Figure 4E:
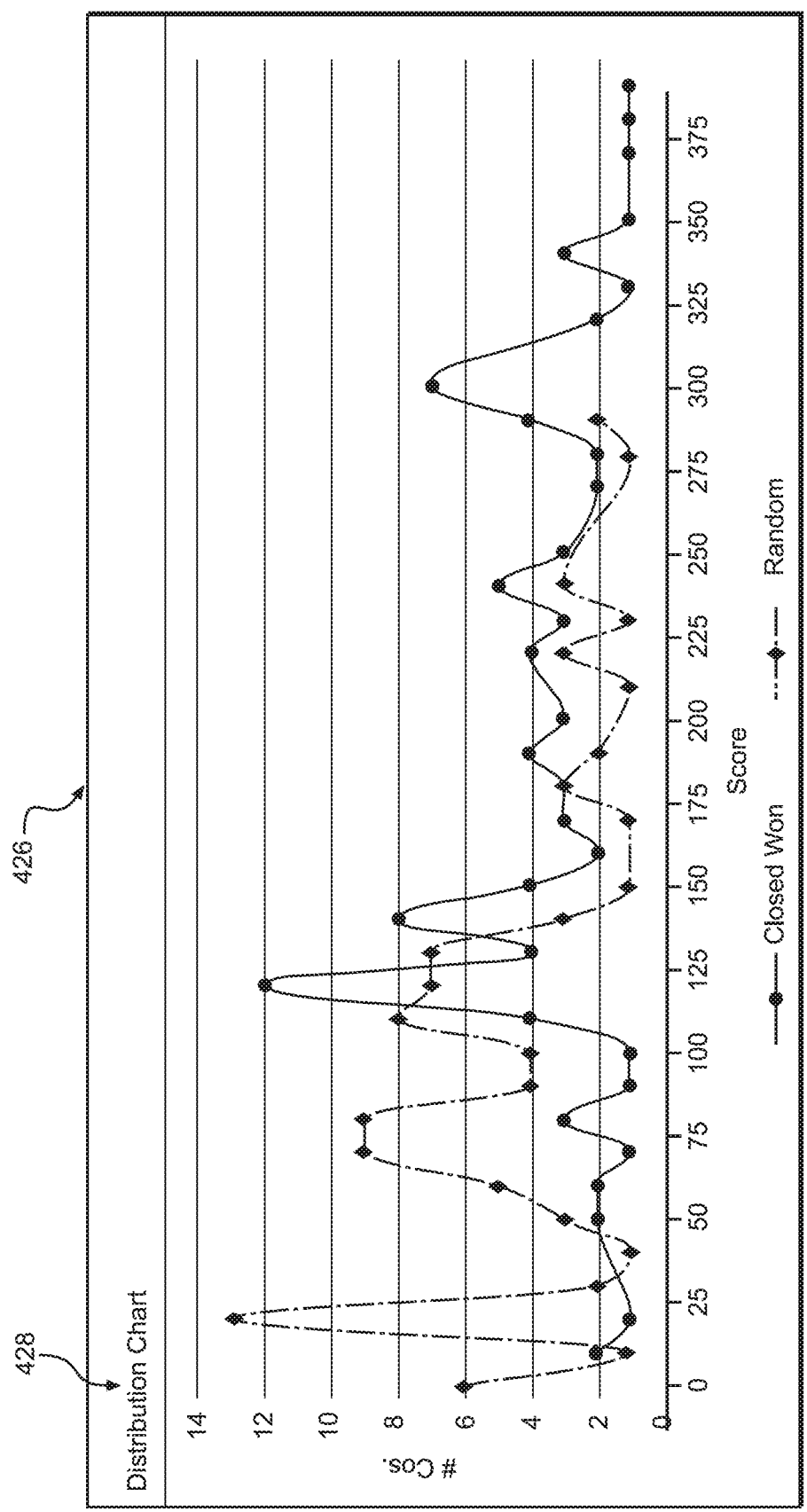

Referring to FIG. 4E, interface 426 presents distribution chart 428, which depicts a change in scoring to the sample and random sets based on the updated criteria. The updated scores may further be presented through the list in interface 404. The user may drill down on individual accounts to determine how scores changed from previous model criteria. The process may be repeated iteratively until the distribution reaches a desired threshold. Thus, the user may tune the model parameters using the interactive interface as a guide to optimize model performance.

Additionally or alternatively, machine learning techniques may be used to tune the model. For example, a machine learning engine may analyze the recent outcomes of actions in an opportunity pipeline. The machine learning engine may learn patterns that are predictive of successful outcomes and suggest corresponding modifications to the model weights/criteria.

If the user is satisfied with a set of model weights/criteria, then these parameters may be published. Once published, the account scores may be updated on demand or at a scheduled time. This may cause the opportunity pipelines for CRM users in an organization to be updated to reflect the change in account scores. In some embodiments, publishing may be restricted to one or more authorized users to prevent different users from submitting conflicting model parameters.

Additionally or alternatively, the model parameters may factor in a present context of a user. For example, if a campaign management application is querying for account scores for a first category of product, then one set of model criteria and corresponding weights may be used. If the application is querying about a second category product, then a different set of model criteria and/or corresponding weight may be used to reflect differing product interests of the account profiles.

4. Using Predictive Models for Account Tiering

In some embodiments, the predictive models for account scoring may be used to configure custom tiers. A tier may correspond to a category or bucket that allows for quick identification of the target companies that are optimal for a given action. Further, tiers allow for equitable and transparent distribution of tasks across several representatives within an organization. For example, actionable opportunities may be automatically routed/distributed evenly by an application such that different representatives have approximately the same number of top tier, middle tier, and lower tier companies.

Additionally or alternatively, other automated actions may be configured to trigger automatically based on account tiering. For example, an automated social media post may be published to only a set of accounts that belong to a tier that is above a threshold. Other examples may include, but are not limited to selecting social media posts such that different posts are directed to companies based on associated tier, automatically editing posts based on tier, blocking a user from making a post directed to accounts within a certain tier, automatically sending campaign messages to account representatives associated with a given tier, automatically accepting/rejecting bids as a function of account tier, etc.

Figure 5A:
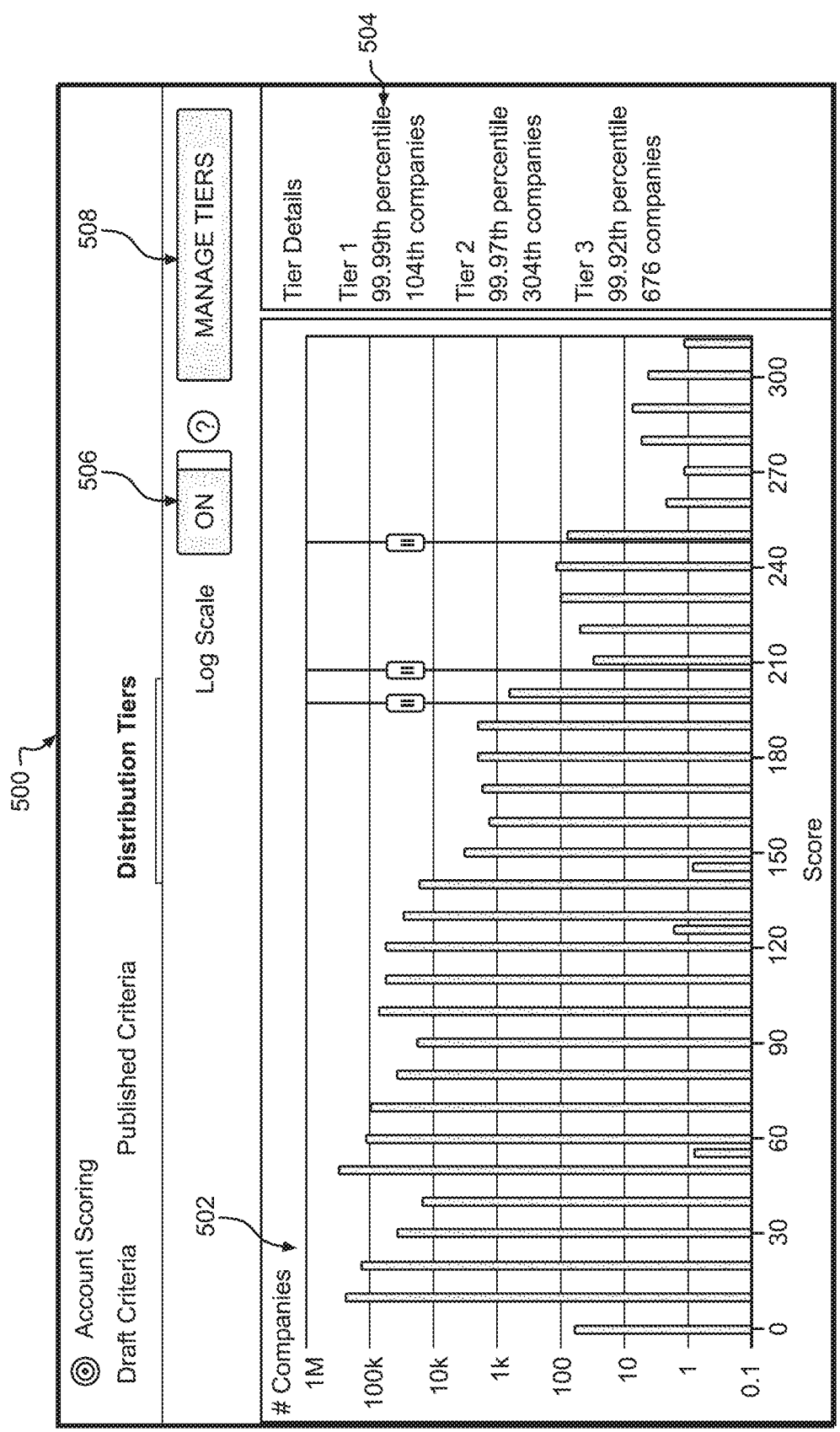
FIG. 5A-C illustrate example interfaces for setting up tiers based on scoring criteria.
Figure 5B:
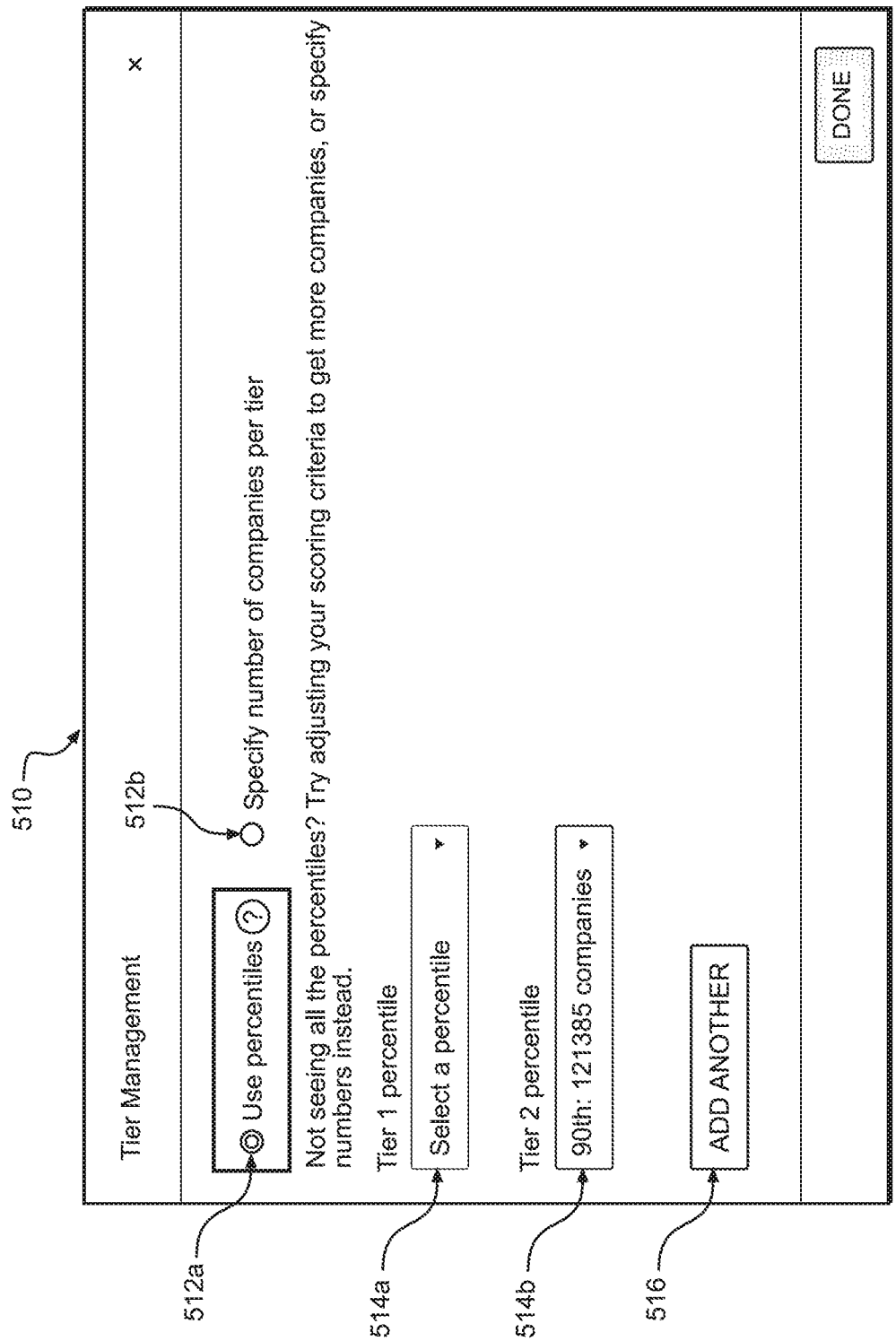
Figure 5C:
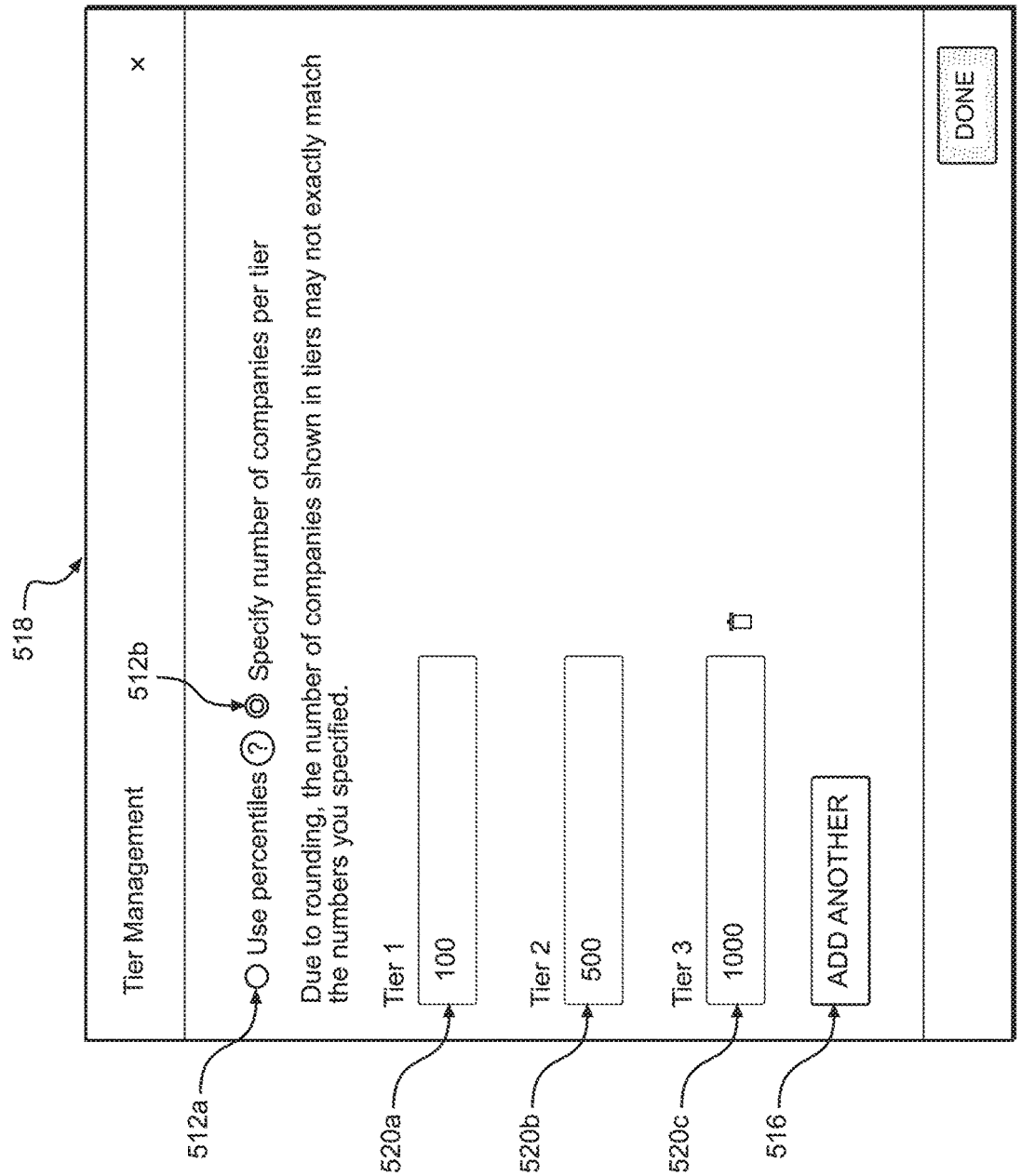

FIG. 5A-C are a set of screenshots illustrating example interfaces for setting up tiers based on scoring criteria in accordance with some embodiments. Referring to FIG. 5A, interface 500 depicts histogram 502 representing a logarithmic distribution of scores across a set of companies. The X-Axis of histogram 502 represent scores with each bin representing a range of account score values. The Y-axis represents the number of companies that belong to each bin. Object pane 504 shows the different tiers, corresponding percentiles, and the number of companies belonging to each tier. Interface object 506 allows a user to toggle between a logarithmic and a linear scale. Interface object 508 allows the criteria for tiering accounts to be viewed and adjusted.

Referring to FIG. 5B, interface 510 provides a set of interface objects for modifying how tiers are classified. The set of interface objects includes radio buttons 512a and 512b, which allow a user to toggle between defining tiers as a function of percentiles or the number of companies desired in each tier. The set of interface objects further includes drop-down menus 514a and 514b to define cutoff points for each tier. In the example illustrated, there are two tiers with configurable percentile values, where the second tier has a cutoff point of $90^{th}$ percentile. The number of companies corresponding within the percentile are also depicted in the drop-down menu. The user may add and define other tiers by selecting "ADD ANOTHER" button 516.

Referring to FIG. 5C, interface 518 depicts an example set of interface objects for defining tiers based on the number of companies that should belong to each tier. The set of interface objects include text boxes 520a-c, through which a user may enter how many companies are limited to each tier. In this example, tier 1 includes the top 100 scored companies, tier 2 includes the next 500 top scored companies, and tier 3 includes the next 1000 top scored companies.

In some embodiments, the user interface may allow the user to interact with a bar or other user interface object to define the tiers. For example, a user may add a set of bars to the distribution chart that define the cutoff points between different tiers. The user may drag and drop the bars to increase/decrease cutoff points.

Once defined, the account profiles satisfying each tier criteria may be identified and assigned a corresponding label identifying the company tier. As previously mentioned, the tier information may be factored into various application-specific functions.

In some embodiments, notifications and/or other automatic actions may be set to trigger when an account changes tiers. For example, AI data engine 108 may monitor for accounts that increase in tiers. If detected, AI data engine 108 may notify one or more client applications. A change in tier may increase the likelihood of certain outcomes for actions directed to the account. To optimize these actionable opportunities, the client application may prioritize one or more actions for the account responsive to the notification.

5. Synchronizing Scores with Client Applications

In some embodiments, the account scoring and/or tiering outputs may be synchronized with one or more client applications. For example, an application, suite of applications, or cloud service may be configured to receive account scores from AI data engine 108. AI data engine 108 may push the account profiles, including the scores and/or tiers output by the predictive model, to client applications or cloud services on a periodic basis or any time a change is detected. In other embodiments, the model output may be provided upon request by a client application.

In some embodiments, AI data engine 108 is part of a cloud service that is accessible by one or more tenants. AI data engine 108 may maintain a mapping between model parameters and tenants, such as in a table or other data structure. Additionally or alternatively, a given tenant may be associated with multiple model parameters. For example, a tenant may have a suite of applications with accesses to the cloud service. Different applications may use different model criteria as a given set of model criteria may be optimal for one application but not necessarily another.

Once a tenant is authenticated with the cloud service, AI data engine 108 may synchronize the model output with one or more client application databases associated with the tenant. As previously noted, AI data engine 108 may push the model output, including account scores and tiers, during the synchronization phase. The tenant may designate and provide access to an application database as a location for the data that is pushed by the cloud service. For example, AI data engine 108 may store a database connection string that allows AI data engine 108 to connect to a remote database and push the results to the database over a network, such as the Internet. AI data engine 108 and the remote node may share a public-private key pairing, digital certificate, and/or other encryption keys to encrypt/decrypt the data.

The client applications may use the synchronized data to perform one or more automated, application-specific actions. For example, an application may identify the top n candidate actionable opportunities of a plurality of candidate opportunities in a pipeline. The client application may present the top n candidate opportunities, sorted from highest score to lowest, to a user for further review and/or automatically trigger actions for each opportunity. Example actions may include, without limitation, selecting and rendering GUI objects based on which accounts are ranked the highest, enriching data, selecting and posting targeted social media content, automatically placing bids on accounts within a tier, halting bids on accounts that have lowered a tier, and deploying resources to improve service provided to an account.

In some embodiments, the account scoring and/or tiering outputs may be synchronized with or otherwise integrated into a cloud service, such as a content distribution platform. Some cloud tools may maintain a customer profile where communication suggestions may be made based on past activity for the customer. For instance, the cloud service may suggest the mode (e.g., email, SMS, social media post, phone), timing (e.g., morning, afternoon, evening), content (e.g., suggested topics, messages), and frequency (e.g., every day, week, etc.) for a marketing campaign. As an example, the cloud tool may suggest emailing a customer around 10 p.m. for the best results as past activity has indicated that they are most responsive by email at that time.

The account scoring and tiering provided by AI data engine 108 may augment cloud tools by weighting opportunities at a company-level based on attributes that may not be available to the cloud service, such as size of a company, industry, etc. The insights may be combined with insights derived from the marketing cloud tool to optimize cloud activities. For example, the cloud service may select companies based on the probabilities of reaching them using a variety of contact methods (based on insights provided by the cloud tool) and heuristics for determining whether or not the company has a threshold score or tier (based insights provided by AI data engine 108).

When a company appears on a list for an actionable opportunity, the system may present a report card for why the company was included. For example, a report may be presented as follows: "Although attempts to contact this company have been unsuccessful in the recent past this company remains on the top list because of their revenue, region, and number of employees (based on AI data engine insights)." As another example, a report may be presented as follows: "Although this company is small and has a relatively low revenue, this company remains on the top list because recent attempts to contact this company have been very successful."

In some embodiments, a content distribution platform may include a user interface including a moveable or otherwise configurable bar that defines a cutoff between companies to be contacted in a content distribution campaign and companies to not be contacted in the content distribution campaign. For instance, the cutoff may be defined by account score (e.g., accounts<500 should not be contacted) or by tier (e.g., accounts in Tier 3 or below should not be contacted).

The above sections provide a non-exhaustive list of examples. Other applications may leverage AI data engine 108 to perform a variety of other functions, depending on the particular implementation.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general-purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, using a model, a first set of scores for a plurality of accounts, wherein a score in first set of scores for a respective account characterizes a priority of interacting with the respective account relative to other accounts in the plurality of accounts, wherein the model defines a set of criteria for scoring accounts, wherein each criterion in the set of criteria is associated with one or more feature values and a weight;
determining a distribution of the plurality of accounts based at least in part on the first set of scores and an outcome of a targeted action;
tuning, by a set of one or more computing resources using a machine learning process, the model based at least in part on the distribution of the plurality of accounts relative to the outcome of the targeted action, wherein tuning the set of criteria comprises iteratively adjusting at least one weight associated with at least one feature value until the distribution of the plurality of accounts satisfies at least one threshold, wherein the threshold is determined based at least in part on positions of data points in the distribution relative to positions of data points in a random distribution;
generating, using the tuned model, a second set of scores for the plurality of accounts; and
performing at least one action using the set of one or more computing resources with respect to a subset of the plurality of accounts based at least in part on the second set of scores, wherein the at least one action is prioritized by the set of one or more computing resources based at least in part on the second set of scores.

2. The method of claim 1, wherein generating the second set of scores for the plurality of accounts comprises generating a first score for a first account by matching criteria in the modified set of criteria to a set of company attributes associated with the first account; and
aggregating weights for each of the matching criteria.

3. The method of claim 1, further comprising segmenting the plurality of accounts into tiers based at least in part on the second set of scores; wherein each tier defines a threshold number of companies or percentile score; wherein performing the at least one action based at least in part on the second set of scores comprises performing the at least one action based at least in part on the tiers; and wherein the at least one action is only performed for accounts that fall within a particular tier.

4. The method of claim 3, further comprising causing display of a user interface comprising a moveable or otherwise configurable bar that defines a cutoff between different tiers.

5. The method of claim 1, wherein the first set of criteria is determined by a machine learning model trained from a plurality of examples labeled as successful or unsuccessful; wherein each score in the first set of scores is indicative of a probability that interacting with a respective account in the first set of accounts will be successful.

6. The method of claim 1, further comprising causing display of a user interface comprising a moveable or otherwise configurable bar that defines a cutoff between companies to be contacted in a content distribution campaign and companies to not be contacted in the content distribution campaign.

7. The method of claim 1, wherein at least one criterion in the set of criteria adds a weight to accounts that use a particular technology or set of technologies.

8. The method of claim 1, wherein at least one criterion assigns weights based at least in part on a company location, headcount, or revenue.

9. The method of claim 1, wherein at least one criterion is associated with a negative weight.

10. One or more non-transitory computer-readable media storing instructions which, when executed by one or more hardware processors cause:
generating, using a model, a first set of scores for a plurality of accounts, wherein a score in first set of scores for a respective account characterizes a priority of interacting with the respective account relative to other accounts in the plurality of accounts, wherein the model defines a set of criteria for scoring accounts, wherein each criterion in the set of criteria is associated with one or more feature values and a weight;
determining a distribution of the plurality of accounts based at least in part on the first set of scores and an outcome of a targeted action;
tuning, by a machine learning process, the model based at least in part on the distribution of the plurality of accounts relative to the outcome of the targeted action, wherein tuning the set of criteria comprises iteratively adjusting at least one weight associated with at least one feature value until the distribution of the plurality of accounts satisfies at least one threshold, wherein the threshold is determined based at least in part on positions of data points in the distribution relative to positions of data points in a random distribution;
generating, using the tuned model, a second set of scores for the plurality of accounts; and
performing at least one action using a set of one or more computing resources with respect to a subset of the plurality of accounts based at least in part on the second set of scores, wherein the at least one action is prioritized by the set of one or more computing resources based at least in part on the second set of scores.

11. The media of claim 10, wherein generating the second set of scores for the plurality of accounts comprises generating a first score for a first account by matching criteria in the modified set of criteria to a set of company attributes associated with the first account; and
aggregating weights for each of the matching criteria.

12. The media of claim 10, further comprising segmenting the plurality of accounts into tiers based at least in part on the second set of scores; wherein each tier defines a threshold number of companies or percentile score; wherein performing the at least one action based at least in part on the second set of scores comprises performing the at least one action based at least in part on the tiers; and wherein the at least one action is only performed for accounts that fall within a particular tier.

13. The media of claim 12, wherein the instructions further cause display of a user interface comprising a moveable or otherwise configurable bar that defines a cutoff between different tiers.

14. The media of claim 10, wherein the first set of criteria is determined by a machine learning model trained from a plurality of examples labeled as successful or unsuccessful; wherein each score in the first set of scores is indicative of a probability that interacting with a respective account in the first set of accounts will be successful.

15. The media of claim 10, wherein the instructions further cause display of a user interface comprising a moveable or otherwise configurable bar that defines a cutoff between companies to be contacted in a content distribution campaign and companies to not be contacted in the content distribution campaign.

16. The media of claim 10, wherein at least one criterion in the set of criteria adds a weight to accounts that use a particular technology or set of technologies.

17. The media of claim 10, wherein at least one criterion assigns weights based at least in part on a company location, headcount, or revenue.

18. The media of claim 10, wherein at least one criterion is associated with a negative weight.

19. A system comprising:
one or more hardware processors;
one or more non-transitory computer-readable media storing instructions which, when executed by the one or more hardware processors cause:
generating, using a model, a first set of scores for a plurality of accounts, wherein a score in first set of scores for a respective account characterizes a priority of interacting with the respective account relative to other accounts in the plurality of accounts, wherein the model defines a set of criteria for scoring accounts, wherein each criterion in the set of criteria is associated with one or more feature values and a weight;
determining a distribution of the plurality of accounts based at least in part on the first set of scores and an outcome of a targeted action;
tuning, by a machine learning process, the model based at least in part on the distribution of the plurality of accounts relative to the outcome of the targeted action, wherein tuning the set of criteria comprises iteratively adjusting at least one weight associated with at least one feature value until the distribution of the plurality of accounts satisfies at least one threshold, wherein the threshold is determined based at least in part on positions of data points in the distribution relative to positions of data points in a random distribution;
generating, using the tuned model, a second set of scores for the plurality of accounts; and
performing at least one action using a set of one or more computing resources with respect to a subset of the plurality of accounts based at least in part on the second set of scores, wherein the at least one action is prioritized by the set of one or more computing resources based at least in part on the second set of scores.

20. The system of claim 19, wherein generating the second set of scores for the plurality of accounts comprises generating a first score for a first account by matching criteria in the modified set of criteria to a set of company attributes associated with the first account; and
aggregating weights for each of the matching criteria.

* * * * *